United States Patent [19]
Bjorklund et al.

[11] 4,093,338
[45] June 6, 1978

[54] APPARATUS FOR PIECEWISE GENERATION OF GRATING-LIKE PATTERNS

[75] Inventors: Gary Carl Bjorklund, West Windsor; Linn Frederick Mollenauer, Colts Necks; Walter John Tomlinson, III, Holmdel, all of N.J.

[73] Assignee: Bell Telephone Laboratories, Incorporated, Murray Hill, N.J.

[21] Appl. No.: 648,326

[22] Filed: Jan. 12, 1976

[51] Int. Cl.² .......................... G02B 5/32; G03H 1/04; G01B 9/02
[52] U.S. Cl. .......................... 350/3.70; 350/162 R; 356/106 R; 356/113
[58] Field of Search .......................... 350/3.5, 162 R; 356/106 R, 113

[56] References Cited

U.S. PATENT DOCUMENTS

| | | | |
|---|---|---|---|
| 3,507,564 | 4/1970 | Franks | 350/162 R |
| 3,650,605 | 3/1972 | Little | 350/3.5 |
| 3,728,006 | 4/1973 | Brooks et al. | 350/3.5 |

FOREIGN PATENT DOCUMENTS

| | | | |
|---|---|---|---|
| 1,965,448 | 7/1971 | Germany | 350/3.5 |

*Primary Examiner*—Ronald J. Stern
*Attorney, Agent, or Firm*—A. A. Tirva

[57] ABSTRACT

Apparatus for piecewise generation of grating-like patterns in photoresponsive material with a coherent the class which splits the coherent beam into two component beams. The two component beams intersect forming a parallel plane interference pattern on a section of the photoresponsive material. An arrangement which translates the beam parallel to itself forms the interference pattern in registration with the previously generated pattern on a different section of the photoresponsive material.

2 Claims, 2 Drawing Figures

APPARATUS FOR PIECEWISE GENERATION OF GRATING-LIKE PATTERNS

BACKGROUND OF THE INVENTION

This invention relates to interferometric apparatus for generation of optical gratings, and particularly to apparatus which piecewise generates grating-like patterns.

Use of interferometric apparatus for generation of optical gratings is well known in the art. Such apparatus usually includes an interferometer which divides a collimated coherent beam of light into two component beams that traverse different optical paths. The component beams are then made to intersect by reflecting one or both of the beams. The intersecting component beams form an interference pattern. The pattern has a high or low intensity depending upon whether the light waves of the two component beams are in-phase (constructive interference) or out-of-phase (destructive interference). The regions of constructive and destructive interference are planes oriented parallel to the bisector of the angle between the two intersecting beams and perpendicular to the plane defined by the beams. The spacing between the light and dark planes is determined by intersection angle between the waves and their wavelengths. The grating-like interference pattern is recorded in a photoresponsive material such as film, photoresist, or other. Linear and reciprocal photoresponsive materials do not require a beam having a high intensity per unit area so that the grating size can be readily increased by increasing the cross-sectional area of the beam with the use of a telescope. Once the beam is spread by the telescope, a collimator lens or mirror is used to align the rays in the beam parallel to each other. A large collimator lens or mirror is either very costly or impossible to make.

When it is desired to generate a grating-like pattern on a nonlinear and nonreciprocal photoresponsive material such as polymethyl metharcylate, or when it is desired to initiate a photochromic process with a two-photon absorption, the intensity of the beam required to efficiently obtain the grating-like pattern has to be so high that only extremely small patterns can be generated with presently available laser sources. Because of limited power of presently available laser sources, a grating-like pattern cannot be formed on a large area unless extremely long exposure times are used.

Therefore, it is an object to generate a large grating-like pattern.

Another object is to provide apparatus for generating a grating-like pattern where the size of the pattern is independent of the light source power.

Yet another object is to provide an inexpensive apparatus for generating a large grating-like pattern.

These and other objects are realized in an illustrative embodiment of the invention in which apparatus for piecewise generation of a grating-like pattern on a photoresponsive material with a coherent beam of light includes an interferometer wherein the coherent beam is split into two component beams which are made to intersect in a photoresponsive material having a planar surface positioned normal to the bisector of the angle between the two intersecting component beams. The intersecting component beams form a parallel plane interference pattern on a section of the photoresponsive material. An arrangement, which translates the coherent beam of light and the component beams parallel to themselves, generates the interference pattern on a different section of the photoresistive material.

A feature of the invention is the arrangement for translating the coherent beam and the component beams parallel to themselves.

Another feature is the formation of the interference pattern in a different section of the photoresistive material.

Another feature is the formation of the interference pattern in overlapping sections of the photoresponsive material.

Another feature of the invention is the adjustment of the difference between the optical path lengths of the two component beams.

Yet another feature of the invention is the adjustment of the angle between two intersecting component beams by rotation of a single element about a fixed axis.

BRIEF DESCRIPTION OF THE DRAWING

A better understanding of the invention may be derived from the Detailed Description as that description is considered with respect to the attached drawings in which.

DETAILED DESCRIPTION

Figure 1:
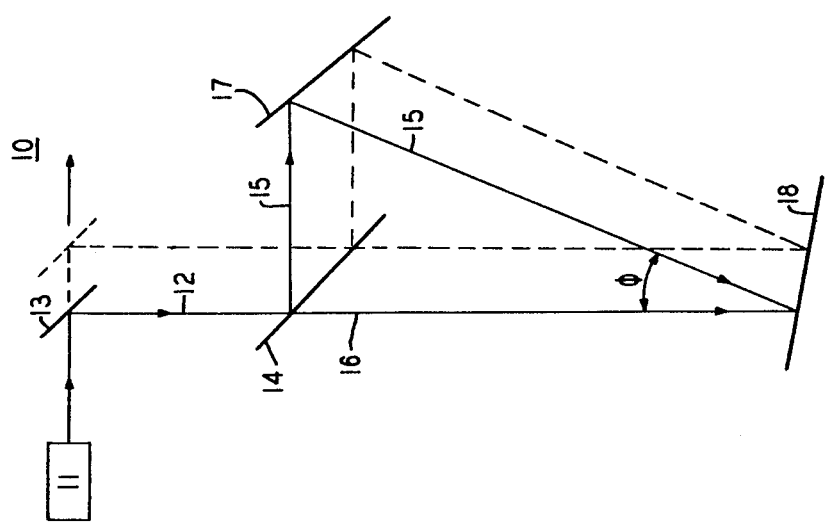
FIG. 1 shows an illustrative embodiment of the invention.

Referring now to FIG. 1, there is shown an apparatus 10 for piecewise generation of grating-like patterns on a photoresponsive material with a coherent beam of light. Apparatus 10 comprises a coherent beam 12 which is generated by a laser source 11 and is directed upon a beamsplitter 14 by a reflector 13. The beamsplitter 14 splits the coherent beam 12 into two component beams 15 and 16. Beamsplitter 14 directs component beam 15 onto a reflector 17 which reflects the component beam so that it intersects component beam 16.

Component beams 15 and 16 are made to intersect in a photoresponsive material 18, which is positioned with a planar surface normal to the bisector of the angle $\phi$ between the two intersecting component beams. Note that the difference between the number of reflections in the component beams is an even number. The intersecting component beams produce a series of equidistant, parallel, planes. This series of planes are alternately dark and light, forming an interference pattern which is recorded in a section of a photoresponsive plane 18.

To expose a different section of the photoresponsive material to the interference pattern while maintaining registration (the same spatial phase) with the already generated pattern, coherent beam 12, and thus the component beams 15 and 16, are translated parallel to themselves. As shown by the dotted lines in FIG. 1, movement of the reflector 13 along an axis parallel to the longitudinal axis of the coherent beam impinging upon reflector 13 translates the beam 12, 15 and 16 parallel to themselves. The movement of reflector 13 is accomplished by mounting it on a commercially available motor driven ball and vee-grove translator stage (not shown). Because the angle between the intersecting beams 15 and 16 remains fixed by the position of reflectors 4 and 17, neither the order of the dark and light planes nor the spacing between them varies as beams 12, 15 and 16 are translated parallel to themselves. Consequently, to expose a different section of the photoresponsive material to the interference pattern formed by the intersecting component beams 15 and 16, reflector 13 can be moved either in a continuous movement or in discrete steps. Translation of beam 12 can be carried out as far as required to generate a pattern of the desired length. To increase the width of the pattern while maintaining registration, the beam is translated normal to itself in a plane normal to the laser beam. The rest of the arrangement is the same as the one used to generate the lengthwise pattern. The overall pattern size is thus limited only by the size of reflectors used and the beam translation apparatus.

It has been observed that interference fringes are produced only when the difference between the optical path lengths of the two component beams are less than a certain maximum length. For conventional light sources it may be as high as a few centimeters, whereas for common lasers it may extend to a few meters, but it is nevertheless finite. The maximum difference of path length under which fringes are observed is called the coherence length of the source. Thus, to minimize the effect of coherence length, the optical path lengths of the two component beams should be substantially equal near the center of the pattern to be generated.

Figure 2:
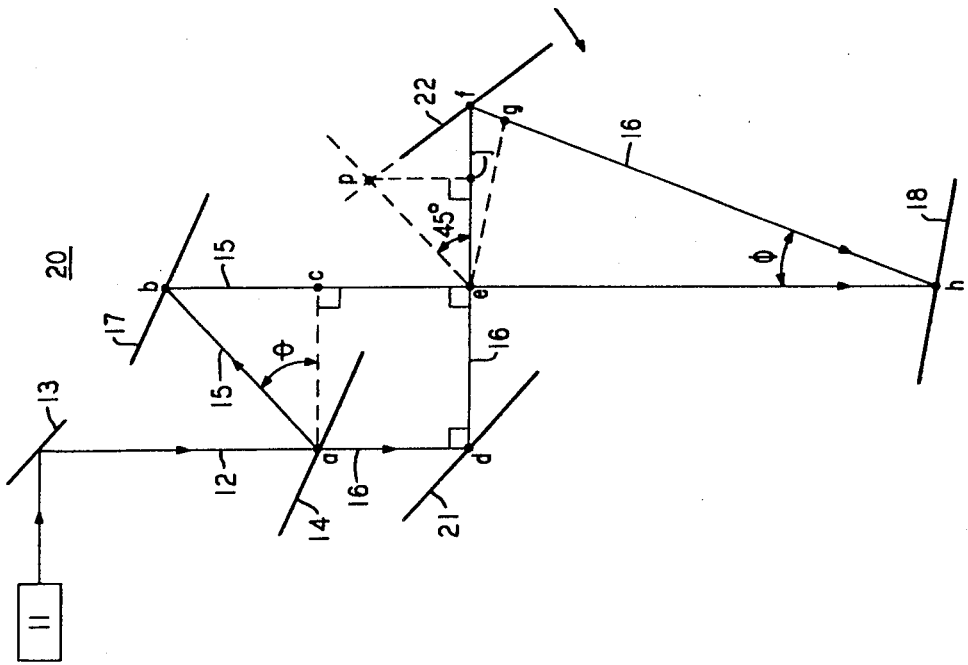
FIG. 2 shows an alternative embodiment of the invention.

Referring now to FIG. 2, there is shown an alternative apparatus 20 for piecewise generation of grating-like patterns. The apparatus 20 is arranged for minimizing the optical path length difference of the two intersecting component beams. The apparatus 20 is similar to apparatus 10 shown in FIG. 1 except for the addition of reflectors 21 and 22. Numbers used in FIG. 1 to designate certain elements are used in FIG. 2 to designate the same elements. Apparatus 20 of FIG. 2, in addition to the beamsplitter 14 and reflector 17, includes reflectors 21 and 22. Component beam 16 is reflected by reflectors 21 and 22 to make the optical path length "adefh" of component beam 16 substantially equal to optical path length "abeh" of component beam 15 while keeping the difference between the number of reflections in the component beams an even number.

In one particular arrangement of interferometric apparatus shown in FIG. 2, the relationships between the beamsplitter 14, reflectors 17, 21 and 22, and component beams 15 and 16 are as follows:

$ac = bc = de$
$ad = ce$
$ep = \sqrt{2}\, de$
$\theta = <pef = 45°$
$<ade = <dec = 90°$ With the component beams 15 and 16 adjusted so that the difference between their optical path lengths is zero, angle $\phi$ between the two intersecting beams can be adjusted by pivoting reflector 22 about point $p$ without changing the difference between the path lengths of component beams 15 and 16.

The exact numerical relations given above for FIG. 2 are based on the assumption of an infinitesimally thin beamsplitter. Beamsplitters of finite thickness will make a slight change in the effective length of path ad. This change can easily be compensated for by making a small adjustment, for example, either in angle $\theta$, or in the ratio of length ep to de. Such change in no way affects the maintenance of zero path length difference with adjustment of $\phi$, as described in the preceding paragraph.

It is to be understood that the above-described arrangements are illustrative of the application of the principles of the invention. As various changes could be made in the above-disclosed arrangements without departing from the scope of the invention, it is intended that all matter contained in the above description, or shown in the accompanying drawings, shall be interpreted as illustrative and not in a limiting sense.

What is claimed is:

1. Apparatus for piecewise generation of a grating-like pattern in a photoresponsive material, the apparatus comprising:

an interferometer having a plurality of elements wherein a coherent beam of light is split into two component beams which are made to intersect;

a photoresponsive material having a planar surface is positioned normal to the bisector of the angle between the two component beams at their intersection, the component beams forming a parallel plane interference pattern in a section of the photoresponsive material, wherein the difference between optical path lengths of the two component beams intersecting in the photoresponsive material can be adjusted to zero at any one point in the material, and the angle of intersection between the two intersecting component beams can be adjusted by rotation of a single element about a fixed axis, without changing the difference between the optical path lengths of the two component beams; and means for translating the coherent beam, and thus the component beams, parallel to themselves so that the intersecting translated component beams form the parallel plane interference pattern in registration with the previously generated pattern in a different section of the photoresponsive material, the translating means comprising a reflector which is moved along an axis parallel to the longitudinal axis of the beam impinging upon the reflector.

2. Method for piecewise generation of a grating-like pattern in a photoresponsive material, the method comprising the steps in the order listed:

splitting a coherent beam of light in two component beams, intersecting the two component beams in a photoresponsive material having a planar surface positioned normal to the bisector of the angle between the two component beams, the component beams forming a parallel plane interference pattern in a section of the photoresponsive material, wherein intersecting the two component beams in a photoresponsive material includes adjusting the component beams so that a difference between optical path lengths of the two component beams can be made zero at any one point in the material and the angle between the component beams can be adjusted by rotating a single element about a fixed axis without changing the difference between the optical path lengths of the two component beams, and translating the coherent beam by moving a reflector upon which the coherent beam impinges parallel to the longitudinal axis of the coherent beam, and thus, translating the component beams, parallel to themselves so that the intersecting translated component beams form the parallel plane interference pattern in registration with the previously generated pattern in a different section of the photoresponsive material.

* * * * *